United States Patent
Chehab et al.

(10) Patent No.: US 12,359,285 B2
(45) Date of Patent: Jul. 15, 2025

(54) STRIP OF ALUMINIUM ALLOY FOR MANUFACTURING BRAZED HEAT EXCHANGERS

(71) Applicant: CONSTELLIUM NEUF-BRISACH, Biesheim (FR)

(72) Inventors: Bechir Chehab, Voiron (FR); Armelle Danielou, Les Echelles (FR); Pablo Lorenzino, Voiron (FR); Lionel Peguet, Quaix en Chartreuse (FR)

(73) Assignee: CONSTELLIUM NEUF-BRISACH, Biesheim (FR)

( * ) Notice: Subject to any disclaimer, the term of this patent is extended or adjusted under 35 U.S.C. 154(b) by 721 days.

(21) Appl. No.: 17/436,040

(22) PCT Filed: Feb. 27, 2020

(86) PCT No.: PCT/FR2020/050390
§ 371 (c)(1),
(2) Date: Sep. 2, 2021

(87) PCT Pub. No.: WO2020/178508
PCT Pub. Date: Sep. 10, 2020

(65) Prior Publication Data
US 2022/0002843 A1 Jan. 6, 2022

(30) Foreign Application Priority Data

Mar. 4, 2019 (FR) ....................... 1902178
Mar. 5, 2019 (FR) ....................... 1902258

(51) Int. Cl.
| | | |
|---|---|---|
| C22C 21/00 | (2006.01) | |
| B23K 1/00 | (2006.01) | |
| B23K 35/00 | (2006.01) | |
| B23K 35/28 | (2006.01) | |
| B23K 103/10 | (2006.01) | |

(52) U.S. Cl.
CPC ............ C22C 21/00 (2013.01); B23K 1/0012 (2013.01); B23K 35/002 (2013.01); B23K 35/288 (2013.01); *B23K 2103/10* (2018.08)

(58) Field of Classification Search
CPC .... C22C 21/00; B23K 1/0012; B23K 35/002; B23K 35/288; B23K 2103/10
See application file for complete search history.

(56) References Cited

U.S. PATENT DOCUMENTS

| | | |
|---|---|---|
| 5,125,452 A | 6/1992 | Yamauchi |
| 5,350,436 A | 9/1994 | Takezoe |
| 6,019,939 A | 2/2000 | Gray |
| 9,546,829 B2 | 1/2017 | Howells et al. |
| 2006/0014043 A1 | 4/2006 | Haller |
| 2010/0183897 A1 | 7/2010 | Kobayashi |

FOREIGN PATENT DOCUMENTS

| | | |
|---|---|---|
| EP | 0326337 A1 | 8/1989 |
| EP | 0718072 A1 | 6/1996 |
| EP | 1075935 A1 | 2/2001 |
| EP | 1413427 A2 | 4/2004 |
| EP | 2969308 B2 | 6/2021 |
| WO | 94/22633 A1 | 10/1994 |
| WO | WO-2014017976 A1 * | 1/2014 ........... B23K 1/0012 |

OTHER PUBLICATIONS

Li, Bao, et al. "Effects of yttrium and heat treatment on the microstructure and tensile properties of Al-7.5 Si-0.5 Mg alloy." Materials & design 32.3 (2011): 1617-1622.*
J. Fred Major, Aluminum and Aluminum Alloy Castings, Casting, vol. 15, ASM Handbook, Edited By Srinath Viswanathan, Diran Apelian, Raymond J. Donahue, Babu DasGupta, Michael Gywn, John L. Jorstad, Raymond W. Monroe, Mahi Sahoo, Thomas E. Prucha, Daniel Twarog, ASM International, 2008, p. 1059-1084, https://doi.org/1.*
International Search Report received in international application No. PCT/FR2020/050390, mailed Jul. 16, 2020, 6 pages.
Preliminary Search Report received in French application No. 1902258, mailed Nov. 28, 2019, 3 pages.

* cited by examiner

*Primary Examiner* — Jessee R Roe
(74) *Attorney, Agent, or Firm* — McBee Moore & Vanik IP, LLC

(57) ABSTRACT

A strip intended for the manufacture of brazed heat exchangers, having a core made of an alloy with the composition (weight %):
Si: 0.10-0.30%, preferably 0.15-0.25%
Fe<0.25%, preferably 0.1-0.2%
Cu: 0.85-1.1%, preferably 0.9-1.0%
Mn: 1.2-1.7%, preferably 1.2-1.4%
Mg: 0.1-0.3%, preferably 0.1-0.21%
Zn<0.1%
Ti 0.05-0.20%, preferably 0.06-0.15%, more preferably 0.06-0.1%
optionally up to 0.15% of Bi and/or Y
other elements <0.05% each and <0.15% in total,
remainder aluminium.

20 Claims, 2 Drawing Sheets

[Fig. 1]
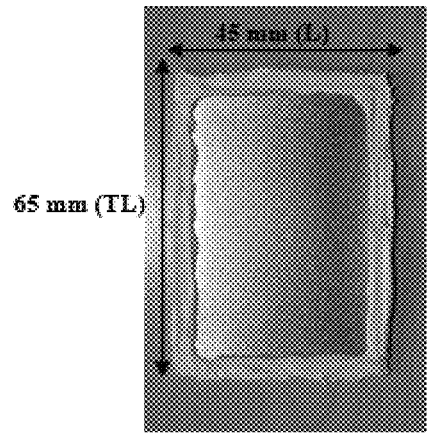
[Fig. 2]
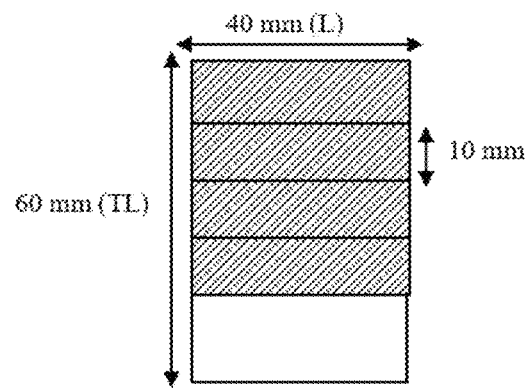
[Fig. 3]
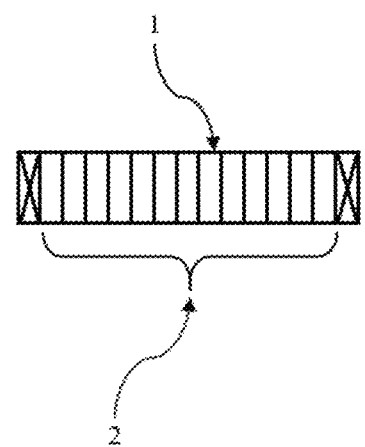

[Fig. 4]
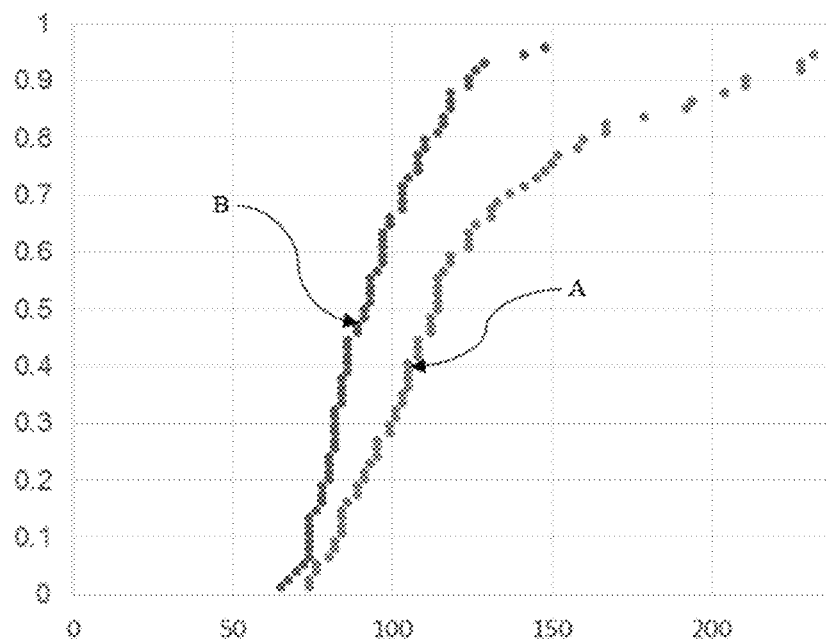
[Fig. 5]
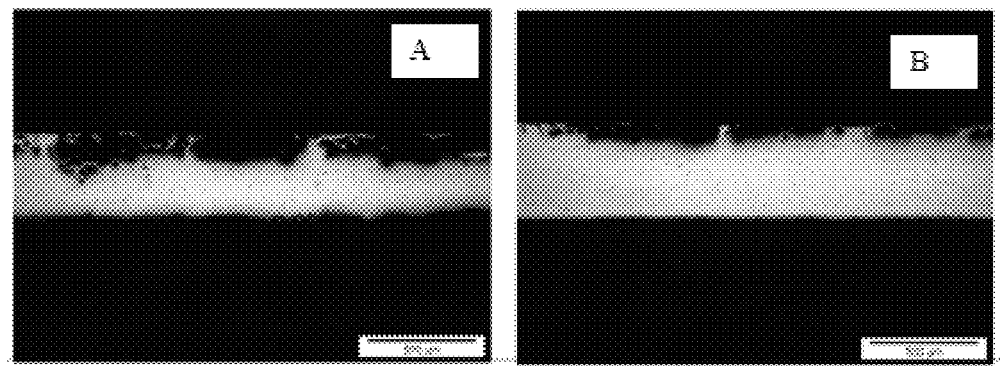

STRIP OF ALUMINIUM ALLOY FOR MANUFACTURING BRAZED HEAT EXCHANGERS

CROSS-REFERENCE TO RELATED APPLICATIONS

This application is the National Stage entry of International Application No. PCT/FR2020/050390, filed 27 Feb. 2020, which claims priority to French Patent Application No. 1902178, filed 4 Mar. 2019 and French Patent Application No. 1902258, filed 5 Mar. 2019.

BACKGROUND

Field of the Invention

The invention relates to strips used in the field of heat exchangers (with a thickness generally comprised from 0.05 to 3 mm, preferably from 0.15 to 2.5 mm) of an aluminium-manganese core alloy (3000 series according to the nomenclature of the Aluminium Association), optionally cladded on one or two face(s) with a coverage alloy, most often an aluminium-silicon brazing alloy (4000 series according to the nomenclature of the Aluminium Association) and/or an interlayer alloy, placed between the core and the optional brazing alloy, made of an aluminium-manganese alloy (3000 series according to the nomenclature of the Aluminium Association). In particular, these strips are intended for the manufacture of elements, such as tubes, collectors and plates, of heat exchangers assembled by brazing. In particular, these heat exchangers are found in engine cooling and passenger compartment air-conditioning systems of motor vehicles. The techniques for brazing aluminium alloys are described for example in the article of J. C. Kucza, A. Uhry and J. C. Goussain "Le brasage fort de l'aluminium et ses alliages", published in Soudage et Techniques Connexes, November-December 1991, pp. 18-29. In particular, the strips according to the invention may be used in non-corrosive flux brazing techniques of the type NOCOLOK® or CAB (controlled atmosphere brazing), or else, according to one variant, in fluxless brazing techniques.

Description of Related Art

The required properties of aluminium alloy strips used for the manufacture of brazed heat exchangers are in particular a good brazability, a high mechanical strength after brazing, so as to use thicknesses that are as small as possible, a formability that is sufficient for an easy forming of the tubes, fins, collectors and plates, before brazing, and a good corrosion resistance. Of course, it is important that the selected alloy is easy to cast and roll, and that the manufacturing cost of the strips is compatible with the requirements of the automotive industry.

A used alloy is the 3003 with the composition (weight % according to the standard EN 573-3):

Si<0.6% Fe<0.7% Cu: 0.05-0.20% Mn: 1.0-1.5% Zn<0.10%

Other elements <0.05% each and <0.15% in total, remainder aluminium.

Numerous alloys have been suggested to improve either one of the aforementioned use properties, more particularly the corrosion resistance, thereby the name of "long-life" alloys that is sometimes given thereto in the industry.

The U.S. Pat. No. 5,125,452 (Sumitomo Light Metal Industries et Nippondenso) describes cladded strips whose base alloy has as a composition:

Si<0.1 Fe<0.3 Cu: 0.05-0.35 Mn: 0.3-1.5 Mg: 0.05-0.5 Ti: 0.05-0.35 with Cu—0.2<Mg<Cu+0.2.

The patent EP 0326337 (Alcan International) describes a cladded strip whose base alloy has as a composition:

Si<0.15 Fe<0.4 Cu: 0.1-0.6 Mn: 0.7-1.5 Mg<0.8.

The low Si content, preferably <0.05%, enables the formation of a layer rich with Mn precipitates, which could serve as a barrier to the diffusion of silicon of the coating alloy, and increases the corrosion resistance. WO 94/22633 is a variant of the previous one which differs only by a higher Cu content (0.6-0.9%).

The U.S. Pat. No. 5,350,436 (Kobe Alcoa and Nippondenso) describes an alloy based on the composition: Si: 0.3-1.3 Cu<0.2 Mn: 0.3-1.5 Mg<0.2 Ti: 0.02-0.3 Fe not mentioned.

While not being bound by theory, it seems that the high Si content (0.8% in the examples) allows compensating for the absence of Cu and Mg for the mechanical strength, the presence of Ti contributes to a good corrosion resistance and the absence of Mg promotes a good brazability.

The patent EP 0718072 (Hoogovens Aluminium Walzprodukte) describes an alloy based on the composition: Si>0.15 Fe<0.8 Cu: 0.2-2 Mn: 0.7-1.5 Mg: 0.1-0.6 with Cu+Mg<0.7 and optional addition of Ti, Cr, Zr or V. The examples feature Si contents of 0.5%.

When trying to sum up the teaching of the state of the art for this type of alloys, it should be noticed that a first category of alloys has a very low Si content (<0.15 and preferably <0.05%) accompanied, or not, with a low Fe content, but, in any case, less stringent than for Si. These very low Si contents (<0.05%) can be obtained only when starting from pure bases, which increases the manufacturing costs. Calling into question the need for a very low Si content to obtain a good corrosion resistance, a second category of alloys features, on the contrary, a rather high Si content (0.5 to 0.8%), possibly to compensate for the loss of mechanical strength related to low contents of hardening elements Mg and Cu. Indeed, for flux brazing, it is known that the Mg content should be reduced, to limit the migration of Mg at the surface of the cladding layer, which leads to the formation of a thick layer of MgO oxide. Other references still target an intermediate Si content (cf. for example EP1075935, EP1413427, EP2969308, or U.S. Pat. No. 9,546,829).

As regards the element Cu, its effect on the corrosion resistance seems to be controversial. Some references do not recommend using a Cu amount that is too high (cf. in particular the U.S. Pat. No. 6,019,939 of Alcan International Limited).

Given the increasing demand of the market, there is still a need for a new core alloy having an improved corrosion resistance in comparison with the existing alloys, yet without degrading the corrosion resistance or the brazability. Such a core alloy could allow addressing the persistent demand for reducing the thickness of the products.

SUMMARY

Surprisingly, the Applicant has determined a composition domain allowing improving the mechanical strength without any degradation of the corrosion resistance or of the brazability.

Thus, an object of the invention is a strip intended for the manufacture of brazed heat exchangers, having a core made of an aluminium alloy with the composition (weight %):

Si: 0.10-0.30%, preferably 0.15-0.25%
Fe<0.25%, preferably 0.1-0.2%
Cu: 0.85-1.1%, preferably 0.9-1.0%
Mn: 1.2-1.7%, preferably 1.2-1.4%
Mg: 0.1-0.3%, preferably 0.1-0.21%
Zn<0.1%
Ti 0.05-0.20%, preferably 0.06-0.15%, more preferably 0.06-0.1%
Optionally up to 0.15% of Bi and/or Y
other elements <0.05% each and <0.15% in total,
remainder aluminium.

Another object of the invention is a method for manufacturing a strip, comprising the successive steps of:
casting of a plate made of the core alloy;
optional cladding with at least one brazing aluminium alloy and optionally at least one interlayer aluminium alloy;
preheating up to a temperature from 450 to 520° C. preferably with holding at the maximum temperature for less than 12 hours, more preferably for less than 3 h;
hot rolling of this plate without prior homogenisation at a temperature from 450 to 520° C. down to a thickness from 2 to 6 mm;
cold rolling to the desired thickness, the thickness of the strip after cold rolling being preferably from 0.15 to 3 mm and
annealing at a temperature from 240 to 450° C., preferably from 240 to 380° C., with holding at the maximum temperature for 10 minutes to 15 hours, preferably for 20 minutes to 3 hours.

According to one variant, another object of the invention is a method for manufacturing a strip according to the present invention, comprising the successive steps of:
casting of a plate made of the core alloy;
homogenisation of this plate at a temperature from 580 to 630° C. for 1 to 24 hours;
optional cladding with at least one brazing aluminium alloy and optionally at least one interlayer aluminium alloy;
preheating up to a temperature from 450 to 520° C. preferably with holding at the maximum temperature for less than 12 hours, more preferably for less than 3 h;
hot rolling of this homogenised and optionally cladded plate at a temperature from 450 to 520° C. down to a thickness from 2 to 6 mm;
cold rolling to the desired thickness, the thickness of the strip after cold rolling being preferably from 0.15 to 3 mm and
annealing at a temperature from 240 to 450° C., preferably from 240 to 380° C., with holding at the maximum temperature for 10 minutes to 15 hours, preferably for 20 minutes to 3 hours.

Another object of the invention is a heat exchanger made at least partially from a strip according to the present invention.

Another object of the invention is the use of a strip according to the present invention, for the manufacture of a heat exchanger, said strip having an improved mechanical strength without any degradation of the corrosion resistance or of the brazability.

BRIEF DESCRIPTION OF THE DRAWINGS

FIG. 1 is a photograph of a sample prepared with a protection of the edges with a silicone seal before the SWAAT corrosion test.

FIG. 2 represents a diagram of the cutting plane of a sample after the corrosion test and after removal of the silicone seals. It consists of a top view of a tested sample.

FIG. 3 represents a principle diagram of the characterisation of corrosion according to the example. It consists of a side sectional view along the width L of the sample of FIG. 2. The reference 1 corresponds to the face exposed to the corrosion attack. The reference 2 corresponds to the areas of measurement of the maximum corrosion depth by fields in optical micrography.

FIG. 4 represents the corrosion depth distribution after four weeks of exposure (SWAAT test) for the samples of the examples. The marking A corresponds to the sample having a core alloy A (prior art). The marking B corresponds to the sample having a core alloy B (according to the invention). The axis of abscissas corresponds to the corrosion depth in µm. The axis of ordinates corresponds to the distribution function.

FIG. 5 represents the sectional micrographs of the strips after the SWAAT test for the samples of the example, after four weeks of exposure. The marking A corresponds to the sample having a core alloy A (prior art). The marking B corresponds to the sample having a core alloy B (according to the invention).

DETAILED DESCRIPTION OF A PREFERRED EMBODIMENT

In the description and the claims, unless stated otherwise:
the designation of the aluminium alloys is compliant with the nomenclature of The Aluminium Association;
the contents of the chemical elements are designated in weight percentages.

Core

The strip according to the invention comprises a core made of an aluminium alloy with the composition (weight %):

Si: 0.10-0.30%, preferably 0.15-0.25%
Fe<0.25%, preferably 0.1-0.2%
Cu: 0.85-1.1%, preferably 0.9-1.0%
Mn: 1.2-1.7%, preferably 1.2-1.4%
Mg: 0.1-0.3%, preferably 0.1-0.21%
Zn<0.1%
Ti 0.05-0.20%, preferably 0.06-0.15%, more preferably 0.06-0.1%
Optionally up to 0.15% of Bi and/or Y
other elements <0.05% each and <0.15% in total,
remainder aluminium.

The composition limits of the base alloy may be justified as follows. A minimum silicon content of 0.10% allows avoiding the use of a pure base, whose cost is high. Moreover, in the alloys containing magnesium, silicon contributes to the mechanical strength through the formation of $Mg_2Si$ precipitates. Beyond 0.30%, silicon may have a detrimental effect on the corrosion resistance, because of the formation of manganese dispersoids AlMnSi and AlMnFeSi.

An iron content limited to less than 0.25% also promotes the corrosion resistance and the formability, but it is not necessary to descend to very low contents <0.15% which would lead to high cost prices.

Copper is a hardening element that contributes to mechanical strength, but beyond 1.1%, coarse intermetallic compounds are formed upon casting which are detrimental to the homogeneity of the metal and form corrosion primer sites. In addition, beyond 1.1%, the castability of the alloy is degraded and the solidus of the core alloy becomes too low, thereby making the brazing temperature range too small.

Manganese is within limits close to those of the alloy 3003; it contributes to the mechanical strength and to the corrosion resistance. The castability of the alloy is reduced beyond 1.4% Mn.

Magnesium has a beneficial effect on the mechanical strength. On the contrary, it is detrimental to brazability, to the extent that it migrates to the surface of the cladding and forms a MgO oxide, and even reduces the effectiveness of the flux. For this reason, its content should be limited to 0.3%. For very stringent applications, it may be necessary to totally suppress magnesium.

A limited addition of zinc may have a beneficial effect on the corrosion resistance, by modifying the electrochemical mechanisms, in particular for most copper-charged alloys. However, it should remain below 0.2% to avoid an excessive generalised susceptibility to corrosion.

The presence of Bi and/or Y may allow carrying out a fluxless brazing.

Brazing Aluminium Alloy

The strips according to the present invention have a thickness generally comprised from 0.05 to 3 mm, preferably 0.1 to 1.8 mm, depending on the type of manufactured part, and may be cladded with a coverage alloy, which may be either a brazing alloy, or an alloy serving as a sacrificial anode to protect the part from corrosion such as a zinc alloy like the alloy AA7072.

The brazing alloy is from the 4xxx alloy family with a liquidus temperature that is low enough in comparison with the solidus of the core alloy to have a sufficient temperature interval for brazing, an acceptable mechanical strength and a good wettability. These alloys may contain addition elements, for example strontium.

Preferably, the strip according to the present invention is cladded on one or two face(s) with a brazing aluminium alloy, preferably a 4xxx alloy comprising from 4 to 13%, preferably from 6 to 11 weight % of Si and up to 0.5%, preferably up to 0.3 weight % of Fe.

Preferably, the brazing aluminium alloy comprises (weight %):
Si: from 5 to 13%;
Fe: up to 1%;
Cu: up to 0.4%, preferably up to 0.1%;
Mn: up to 0.2%, preferably up to 0.1%;
Mg: up to 0.3%, preferably up to 0.1%;
Zn: up to 0.2%, preferably up to 0.1%;
Ti: up to 0.30%, preferably up to 0.1%;
other elements: lower than 0.05% each and lower than 0.15% in total;
remainder aluminium.

As an example, the composition AA4045 is an aluminium alloy that could be suitable as a brazing alloy according to the present invention. Its composition is, in weight %: from 9 to 11% of Si, up to 0.8% of Fe, up to 0.30% of Cu, up to 0.05% of Mn, up to 0.05% of Mg, up to 0.10% of Zn, up to 0.20% of Ti, other elements lower than 0.05% each and lower than 0.15% in total, the remainder consisting of aluminium.

As an example, the previous composition preferably comprises up to 0.6% of Fe.

As an example, the previous composition preferably comprises up to 0.1% of Cu.

As an example, the composition AA4343 is an aluminium alloy that could be suitable as a brazing alloy according to the present invention. Its composition is, in weight %: from 6.8 to 8.2% of Si, up to 0.8% of Fe, up to 0.25% of Cu, up to 0.10% of Mn, up to 0.05% of Mg, other elements lower than 0.05% each and lower than 0.15% in total, the remainder consisting of aluminium.

As an example, the previous composition preferably comprises up to 0.3% of Fe.

As an example, the previous composition preferably comprises up to 0.1% of Cu.

Preferably, the brazing alloy according to the present invention comprises no Mg.

It is also possible to use as a cladding, on one of the faces, an aluminium alloy with a sacrificial anode effect, in particular an alloy containing zinc, such as the alloy AA7072.

Interlayer Aluminium Alloy

Preferably, the strip according to the present invention is cladded on one or two face(s) with a so-called interlayer aluminium alloy, placed between the core and the optional brazing alloy, preferably comprising (in weight %):
Si: up to 0.5%, more preferably up to 0.2%;
Fe: up to 0.7%, more preferably up to 0.3%, still more preferably up to 0.2%;
Mn: from 0.3 to 1.4%, more preferably from 0.6 to 0.8%, according to one variant between 1 and 1.3%;
Cu: up to 0.3%, preferably up to 0.1%, still more preferably up to 0.05%; other elements <0.05% each and <0.15% in total;
remainder aluminium.

Preferably, the interlayer aluminium alloy of the strip according to the present invention comprises (weight %): Si<0.15%; Fe<0.2%; Cu<0.1%; Mn from 0.6 to 0.8%; Mg<0.02%;
other elements <0.05% and <0.15% in total, remainder aluminium.

Preferably, the interlayer aluminium alloy is an alloy from the AA3xxx series.

Strip

Preferably, the strip according to the present invention has a maximum tensile strength Rm (measured according to the standard ISO 6892-1 after brazing) higher than 180 MPa, more preferably higher than 190 MPa, still more preferably higher than 195 MPa.

The strip according to the present invention is a so-called brazing strip, which may serve in the manufacture of different portions of a heat exchanger, for examples tubes, plates, collectors, etc.

It has been noticed (yet not illustrated in the examples) that the strip according to the present invention allows improving the fatigue behaviour. Besides, it should be noted that the absence of homogenisation of the core seems to improve the fatigue behaviour even more.

Method

Another object of the invention is a method for manufacturing a strip, comprising the following steps of:
casting of a plate made of the core alloy;
optional cladding with at least one brazing aluminium alloy and optionally at least one interlayer aluminium alloy;
preheating up to a temperature from 450 to 520° C. preferably with holding at the maximum temperature for less than 12 hours, more preferably for less than 3 h;
hot rolling without prior homogenisation at a temperature from 450 to 520° C. down to a thickness from 2 to 6 mm;

cold rolling to the desired thickness, the thickness of the strip after cold rolling being preferably from 0.15 to 3 mm and annealing at a temperature from 240 to 450° C., preferably from 240 to 380° C., with holding at the maximum temperature for 10 minutes to 15 hours, preferably for 20 minutes to 3 hours.

According to one variant, another object of the invention is a method for manufacturing a strip according to the present invention, comprising the following steps of:

casting of a plate made of the core alloy;

homogenisation of this plate at a temperature from 580 to 630° C. for 1 to 24 hours;

optional cladding with at least one brazing aluminium alloy and optionally at least one interlayer aluminium alloy;

preheating up to a temperature from 450 to 520° C. preferably with holding at the maximum temperature for less than 12 hours, more preferably for less than 3 h;

hot rolling of this homogenised and optionally cladded plate at a temperature from 450 to 520° C. down to a thickness from 2 to 6 mm;

cold rolling to the desired thickness, the thickness of the strip after cold rolling being preferably from 0.15 to 3 mm and annealing at a temperature from 240 to 450° C., preferably from 240 to 380° C., with holding at the maximum temperature for 10 minutes to 15 hours, preferably for 20 minutes to 3 hours.

Preferably, there is no intermediate annealing in the methods according to the present invention.

When it is intended for parts with a substantial forming, the strip may be used in the annealed temper (O temper) by proceeding with a final annealing at a temperature comprised between 320 and 380° C., in a continuous furnace or in a batch furnace. This annealing leads to the recrystallisation of the alloy and improves the formability. In the other cases, it is used in the hardened state, which leads to a better mechanical strength, for example a H14 or H24 temper (according to the standard NF EN 515), this last temper being obtained through a recovery annealing between 250 and 300° C., avoiding recrystallisation.

Before installing the cladding material, it is possible to proceed with a homogenisation of the core alloy plate at a temperature comprised from 580 to 630° C. This homogenisation promotes the ductility of the rolled strip and it is recommended when the strip is used in the 0 temper. It promotes the coalescence of dispersoids with Mn.

Use

Another object of the invention is a heat exchanger made at least partially from a strip according to the present invention.

Another object of the invention is the use of a strip according to the present invention, for the manufacture of a heat exchanger, said strip having an improved mechanical strength without any degradation of the corrosion resistance or of the brazability.

The strips according to the present invention may be used in the manufacture of radiators, in particular for motor vehicles, such as engine cooling radiators, oil radiators, heating radiators and intercoolers, as well as in air-conditioning systems.

Examples

Four alloys have been cast, whose compositions are given in Table 1 hereinafter in weight percentages. The alloy A is a core alloy according to the prior art. The alloy B is a core alloy according to the present invention. The alloy C is a brazing alloy AA4343. The alloy D is an alloy used as an interlayer alloy.

TABLE 1

| | Alloy | | | | | |
|---|---|---|---|---|---|---|
| | Si | Fe | Cu | Mn | Mg | Ti |
| A | 0.18 | 0.15 | 0.78 | 1.34 | 0.18 | 0.085 |
| B | 0.16 | 0.16 | 1.00 | 1.34 | 0.18 | 0.078 |
| C | 7.2 | 0.15 | — | — | — | — |
| D | 0.1 | 0.1 | — | 0.7 | — | — |

The alloys described in Table 1 hereinbefore have been used to form four-layer sandwiches, according to the following configuration:

brazing alloy (alloy C—7.5% of the overall thickness)
interlayer alloy (alloy D—10% of the overall thickness)
core alloy (alloy A or B—75% of the overall thickness)
brazing alloy (alloy C—7.5% of the overall thickness).

Each configuration (with the core A or the core B) has been tested with and without homogenisation (the homogenisation lasting 8 hours at 610° C.). Hence, four samples have been tested.

After casting, optional homogenisation of the core alloy and assembly of the layers, the sandwiches have been pre-heated up to 500° C. for 1 to 8 hours and hot rolled at this temperature down to an overall thickness of 3.5 mm. Afterwards, the sandwiches have been cold rolled without any intermediate annealing down to an overall thickness of 480 µm. Finally, the obtained strips have been subjected to an annealing to obtain an O metallurgical temper, at 360° C. for 1 hour for the strips having a homogenised core, and at 430° C. for 1 hour for the strips having a non-homogenised core.

Afterwards, a brazing has been carried out in a batch furnace for 2 minutes at 600° C.

Mechanical Properties

The mechanical characteristics of the strips obtained before (breaking strength Rm expressed in MPa, yield strength at 0.2% $R_{0.2}$ expressed in MPa and the elongation A expressed in %) have been measured (before and after brazing), according to the standard ISO 6892-1. The results are reported in Table 2 hereinafter.

TABLE 2

| Core alloy | Core homogenisation | $R_{0.2}$ (MPa) | Rm (MPa) | A (%) |
|---|---|---|---|---|
| Before brazing (O temper) | | | | |
| A | no | 74 | 182 | 12 |
| B | no | 81 | 198 | 13 |
| A | yes | 74 | 171 | 17 |
| B | yes | 72 | 174 | 16 |
| After brazing | | | | |
| A | no | 73 | 187 | 11 |
| B | no | 80 | 201 | 9 |
| A | yes | 65 | 179 | 16 |
| B | yes | 76 | 196 | 15 |

After brazing, the strips having a core according to the present invention have shown a significant increase in the mechanical properties, with or without homogenisation.

The strips having a core according to the present invention have shown an elongation in the same order of magnitude as the strips having a core according to the prior art. The elongation has been improved with the homogenisation of the core for both tested core alloys.

After brazing, the elongation is the main criterion for ensuring a sufficient ductility for stamping. The elongation has been in the same order of magnitude for both tested cores. The elongation has been improved with the homogenisation of the core for both core alloys.

In the case of a strip having an O metallurgical temper, the homogenisation of the core seems to be preferably because it seems to allow for a better elongation. Besides, the homogenisation of the core is deemed to reduce the sensitivity to dissolution during brazing in comparison with a non-homogenised core.

Corrosion Resistance

The corrosion resistance has been determined on samples like those described before, with a homogenised core, but on the face without the interlayer alloy. The SWAAT test (sea water acetic acid test) according to the standard ASTM G85 A3 has been used for 4 weeks. Samples with dimensions 45 mm (L)×65 mm (TL)×0.22 mm (TC) have been collected on each sheet metal (cf. FIG. 1). The samples have been degreased with acetone. In order to expose only the face to be tested, the edges as well as the back of the sample have been protected respectively with silicone and an adhesive. The tested surface measured about 40 mm (L)×60 mm (TL) while considering a protection of the edges measuring about 5 mm. The surface that is exposed to the corrosion test measured about 2400 mm$^2$±100. The SWAAT test is a cyclic test composed by a mist phase lasting 30 min and a humid phase lasting 1 h30. It takes place at a temperature of 49° C. After 4 weeks of SWAAT test, the samples have been rinsed with hot water and scoured during 10 min with nitric acid at 70%. Upon completion of this scouring, sectional micrographs (direction L×TC) have been performed: 4 strips of 40 mm (L)×10 mm (TL)×0.22 mm (TC) have been cut as indicated in FIG. 2.

Besides, representative optical micrographs have been captured on the 4 strips. Then, a measurement of the maximum depth of attack by successive fields has been performed at a ×50 magnification covering the entire section (cf. FIG. 3).

More specifically, on the 4 observed strips, it is the maximum depth affected by corrosion which has been measured at a ×50 magnification and reported for each of the successive micrographic fields. A population of corrosion depths has then been obtained which have been classified from the smallest depth to the largest one. This increasing population has then been represented in a graph with the corrosion depths classified increasingly in the abscissas and with their corresponding distribution function in the ordinates, represented by the function n/(N+1), n being the rank within the population and N the size of the population.

FIG. 4 shows the corrosion depth distribution for both tested samples. FIG. 5 shows a micrograph of the tested samples after 4 weeks of SWAAT test.

FIGS. 4 and 5 shows that the sample having the core according to the present invention (B) has a better corrosion resistance in comparison with the sample having a core according to the prior art (A).

The invention claimed is:
1. A strip intended for manufacture of a brazed heat exchanger, having a core made of an aluminium alloy with the composition (weight %):
Si: 0.10-0.30%,
Fe<0.25%,
Cu: 0.85-1.1%,
Mn: 1.2-1.7%,
Mg: 0.1-0.3%,
Zn<0.1%
Ti 0.05-0.20%,
other elements <0.05% each and <0.15% in total,
remainder aluminium,
wherein the strip is cladded on one or two face(s) with a brazing aluminium alloy,
wherein the strip is cladded on one or two face(s) with an interlayer aluminium alloy, placed between the core and the brazing aluminium alloy, the interlayer aluminium alloy comprises:
Si: up to 0.5%;
Fe: up to 0.7%;
Mn: from 0.3 to 1.4%;
Cu: up to 0.3%;
other elements <0.05% each and <0.15% in total;
remainder aluminium.

2. The strip according to claim 1, wherein the brazing aluminium alloy comprises from 4 to 13% of Si and up to 0.5% of Fe.

3. The strip according to claim 2, wherein the brazing aluminium alloy comprises (weight %):
Si: from 5 to 13%;
Fe: up to 1%;
Cu: up to 0.4%;
Mn: up to 0.2%;
Mg: up to 0.3%;
Zn: up to 0.2%;
Ti: up to 0.30%;
other elements: lower than 0.05% each and lower than 0.15% in total;
remainder aluminium.

4. The strip according to claim 1, wherein the interlayer aluminium alloy comprises (weight %): Si<0.15%; Fe<0.2%; Cu<0.1%; Mn from 0.6 to 0.8%; Mg<0.02%; other elements <0.05% and <0.15% in total, remainder aluminium.

5. The strip according to claim 1, having a maximum tensile strength Rm (standard ISO 6892-1 after brazing) higher than 180 MPa.

6. A method for manufacturing a strip according to claim 1, comprising successively:
casting of a plate made of the core alloy;
preheating up to a temperature from 450 to 520° C. with holding at the maximum temperature for less than 12 hours;
hot rolling of this plate without prior homogenisation at a temperature from 450 to 520° C. down to a thickness from 2 to 6 mm;
cold rolling to the desired thickness, the thickness of the strip after cold rolling being from 0.15 to 3 mm and
annealing at a temperature from 240 to 450° C., with holding at the maximum temperature for 10 minutes to 15 hours.

7. A method for manufacturing a strip according to claim 1, comprising successively:
casting of a plate made of the core alloy;
homogenisation of this plate at a temperature from 580 to 630° C. for 1 to 24 hours;
preheating up to a temperature from 450 to 520° C. with holding at the maximum temperature for less than 12 hours;
hot rolling of this homogenised at a temperature from 450 to 520° C. down to a thickness from 2 to 6 mm;
cold rolling to the desired thickness, the thickness of the strip after cold rolling being from 0.15 to 3 mm and annealing at a temperature from 240 to 450° C., with holding at the maximum temperature for 10 minutes to 15 hours.

8. A heat exchanger made at least partially from a strip according to claim 1.

9. A product comprising a strip according to claim 1, for manufacture of a heat exchanger, said strip having an improved mechanical strength without any degradation of the corrosion resistance or of the brazability.

10. The strip according to claim 1, wherein the core has a Si content of 0.15-0.25%.

11. The strip according to claim 1, wherein the core has a Fe content of 0.1-0.2%.

12. The strip according to claim 1, wherein the core has a Cu content of 0.9-1.0%.

13. The strip according to claim 1, wherein the core has a Mn content of 1.2-1.4%.

14. The strip according to claim 1, wherein the core has a Mg content of 0.1-0.21%.

15. The strip according to claim 1, wherein the interlayer aluminium alloy has a Mn content of 1 to 1.3%.

16. The strip according to claim 1, wherein the interlayer aluminium alloy has a Mn content of 0.6 to 0.8%.

17. The strip according to claim 1, wherein the core further comprises up to 0.15% of Bi and/or Y.

18. The strip according to claim 1, wherein the core has a Ti content of 0.06-0.15%.

19. The strip according to claim 1, wherein the core has a Ti content of 0.06-0.1%.

20. The strip according to claim 1, wherein the strip has a maximum tensile strength Rm (standard ISO 6892-1 after brazing) higher than 195 MPa.

* * * * *